(12) United States Patent
Suwito et al.

(10) Patent No.: US 7,397,631 B1
(45) Date of Patent: Jul. 8, 2008

(54) STAMPED STATORS FOR DISK DRIVES

(75) Inventors: Wantjinarjo Suwito, Longmont, CO (US); Robert J. Miles, Longmont, CO (US); Ernst W. Ridinger, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 339 days.

(21) Appl. No.: 11/254,435

(22) Filed: Oct. 19, 2005

Related U.S. Application Data

(60) Provisional application No. 60/642,410, filed on Jan. 7, 2005.

(51) Int. Cl.
G11B 33/14 (2006.01)
(52) U.S. Cl. .................................. 360/97.03; 360/97.02
(58) Field of Classification Search .............. 360/97.01, 360/97.02, 97.03
See application file for complete search history.

(56) References Cited

U.S. PATENT DOCUMENTS

| | | | | |
|---|---|---|---|---|
| 6,930,857 B1 * | 8/2005 | Lin et al. | ................. | 360/97.02 |
| 7,002,773 B2 * | 2/2006 | Kang et al. | ............... | 360/97.02 |
| 2005/0185324 A1 * | 8/2005 | Suwa et al. | ............... | 360/97.02 |
| 2005/0270691 A1 * | 12/2005 | Pottebaum et al. | ........ | 360/97.02 |
| 2006/0146443 A1 * | 7/2006 | Chang et al. | ............. | 360/97.02 |

* cited by examiner

*Primary Examiner*—William J Klimowicz
(74) *Attorney, Agent, or Firm*—Sheridan Ross P.C.

(57) ABSTRACT

Disk stators or air deflectors are provided for controlling undesirable air flow characteristics in a disk drive. In a four-disk pack arrangement, the stators are arranged in a group of three stacked stators wherein a middle or interior stator is planar, and the upper and lower stators each have complementary shapes with offset mounting brackets thereby providing gaps between the stators. Openings formed in the stators are aligned with one another when assembled enabling a locating pin protruding from the base of the disk drive to be received within the openings. The disk stators can also be incorporated in other disk pack arrangements such as two and three disk packs. The stators are preferably formed in a stamping manufacturing process thereby reducing manufacturing costs.

16 Claims, 6 Drawing Sheets

STAMPED STATORS FOR DISK DRIVES

CROSS REFERENCE TO RELATED APPLICATION

Priority is claimed from U.S. Provisional Patent Application No. 60/642,410 filed on Jan. 7, 2005, and entitled "Stamped Stators for Disk Drives" and further identified the disclosure of which is incorporated wherein by reference in its entirety.

FIELD OF THE INVENTION

This invention relates to disk drives, and more particularly, to stamped stators or air deflectors that control undesirable airflow characteristics in the disk drive.

BACKGROUND OF THE INVENTION

Magnetic-disk drives generally utilize rotary actuators to position one or more magnetic read/write heads (also known as transducers) with respect to a similar number of magnetic disks rotatably mounted on a hub driven by a motor. The read/write heads are moved among particular tracks of the magnetic disks to gain access to the information recorded on those track and/or to write information to a particular location on a disk.

The read/write heads for a particular disk are mounted on an air bearing slider. The slider positions the read/write heads above the data surface of the corresponding disk by a cushion of air generated by the rotating disk. Alternatively, the slider may operate in contact with the surface of the disk. The slider is mounted to a suspension load beam or suspension arm. The suspension arm maintains the read/write heads and the slider adjacent to or in contact with the data surface of the corresponding disk with as low a loading force as possible. The combination of the read/write heads, slider and suspension arm is sometimes referred to as the head gimbal assembly (HGA).

The suspension arm is connected to the distal end of a rotary actuator arm pivotally installed within the housing of the disk drive. A voice coil motor pivots the actuator arm to position the read/write heads over desired tracks at selected radii of the magnetic disk.

Rotation of a disk at very high RPMs within the disk drive creates an air flow pattern within the disk drive and creates the cushion of air mentioned above. A particular air flow pattern created depends upon a number of factors to include the number of disks used in the particular drive, the RPM speed of the rotating disk(s), as well as the particular shape of the interior surfaces of the disk drive. However, air flow in the drive also exerts a force on the suspension arm and actuator arm that destabilizes tracking of the transducer.

Disk drive capacity has been increased by incorporating higher disk track densities. In order to accommodate these higher disk densities, the heads must be made smaller and are required to fly closer to the disk in order to be capable of reliably reading and writing data to and from the disk surface. As the disk is rotating, each head is supposed to follow a certain track on the disk surface. The tracks typically contain servo information used in a servo routine to locate and maintain a center position for the heads. Many factors can cause a particular head to be misaligned with respect to a track. Some of these factors include disk warpage, disk vibration, windage, motor run out and others. Some servo systems may have the capability to correct these adverse influences to a certain degree. However, there is always a small amount of inaccuracy present in a head following the center of a disk track. This inaccuracy can be referred to as track misregistration.

One example of a prior art device used to reduce the adverse effects of air flow on an actuator arm is disclosed in U.S. Pat. No. 6,762,908. The disk drive disclosed in this reference includes an air deflector or disk stator which deflects at least a portion of air flow away from the actuator arm assembly of the drive. The air deflector is in the form of a c-shaped finger that attaches to the magnet post of the voice coil motor.

Although disk air deflectors or disk stators can be useful in remediating undesirable effects of air flow on an actuator arm, as well as to reduce overall disk vibration and windage, disk stators add significant cost to a disk drive. Many disk stators have complex shapes, and the cost to machine each disk stator, in conjunction with the cost of the materials, can inhibit the commercial viability of the disk drive. Thus, there is a need for a cost effective yet functional disk stator.

Additionally, for disk packs, it is necessary to mount multiple disk stators so that they extend between the gaps of the stacked disks, but do not contact the disks. Current disk drives have very small gaps between the disks in a disk pack, therefore, the stators have to be precisely positioned so that they do no inadvertently contact the disks. During a shock event, if a stator contacts the media of a disk, such contact can ruin the disk making the disk drive inoperable. Therefore, there is also a need for providing a cost-effective disk stator design that contributes to exact placement of a group of stators in a disk pack to prevent contact with the surfaces of the adjacent disks.

SUMMARY OF THE INVENTION

The present invention provides a group of disk stators for use in a disk pack comprising a plurality of disks. One or more disk stators used in a disk pack may be referred to as a stator assembly.

The basic structure of the stators are characterized by planar bodies having curved or arcuate shapes that help to minimize disruptive airflow, disk vibration and windage. Three mounting brackets or mounting ears are formed on the outer periphery of each stator body. Preferably, the brackets are equally spaced from one another with a bracket located at each end of the body, and a center or interior bracket spaced between the end brackets. The mounting brackets are especially configured to improve the ability to stack the stators yet minimize tolerance errors in the stacked group.

In a first embodiment usable in a four-disk pack, the middle stator of the stator assembly has mounting brackets that are flat or co-planar with respect to the body of the stator. The lower or bottom stator has mounting brackets that are offset from the plane of the stator body, these mounting brackets each having an orthogonal component creating an offset, and a parallel component extending parallel to the plane of the stator body. The orthogonal component and the parallel extending component form a bend. The upper or top stator is a mirror image of the lower stator wherein the upper stator also has mounting brackets each with an orthogonal component creating an offset, and a parallel component extending parallel to the plane of the stator body. When the three stators are stacked, the respective mounting brackets align with one another. The two offsets formed by the orthogonal components of the upper and lower stator mounting brackets define a pair of gaps between the stators to receive the disks of the disk pack.

In a three-disk pack, only two stators are required. Either the lower or upper stator has mounting brackets that are co-planar with respect to the body of the stator, while the other of the stators has offset brackets. In a two-disk pack, only a single stator is required, and this stator may have the flat mounting brackets.

Preferably, each mounting ear or mounting bracket has an opening to receive a fastener such as a screw. Additionally, at least two of the three mounting brackets on each stator preferably include an alignment opening and a tooling opening. The alignment openings are used to precisely position the stators within the disk drive during assembly. The alignment openings receive alignment or locating pins which protrude from the base of the disk drive. During assembly, the locating pins allow the stators to be precisely positioned in the drive. However, there is always some degree of misalignment when the stators are placed over the locating pins during assembly. One of the alignment openings may be round and sized for a close tolerance fit with a corresponding locating pin. The other of the alignment openings may have a curved slot shape which helps minimize undue contact between a corresponding locating pin that may not be aligned with the stator during assembly. The tooling holes allow automated manufacturing equipment to handle the disk stators during manufacture and assembly.

The disk stators of the present invention are preferably manufactured by stamping. Stamping is a much more economical manufacturing process for metal parts as compared to machining. The particular shapes of the stators make them conducive to manufacture by stamping. For example, the mounting brackets take advantage of either a flat extension with respect to the body of the stator, or a single bend with respect to the body.

Other features and advantages of the invention will become apparent from a review of the drawings, taken in conjunction with the detailed description.

DETAILED DESCRIPTION OF THE DRAWINGS

Figure 1:
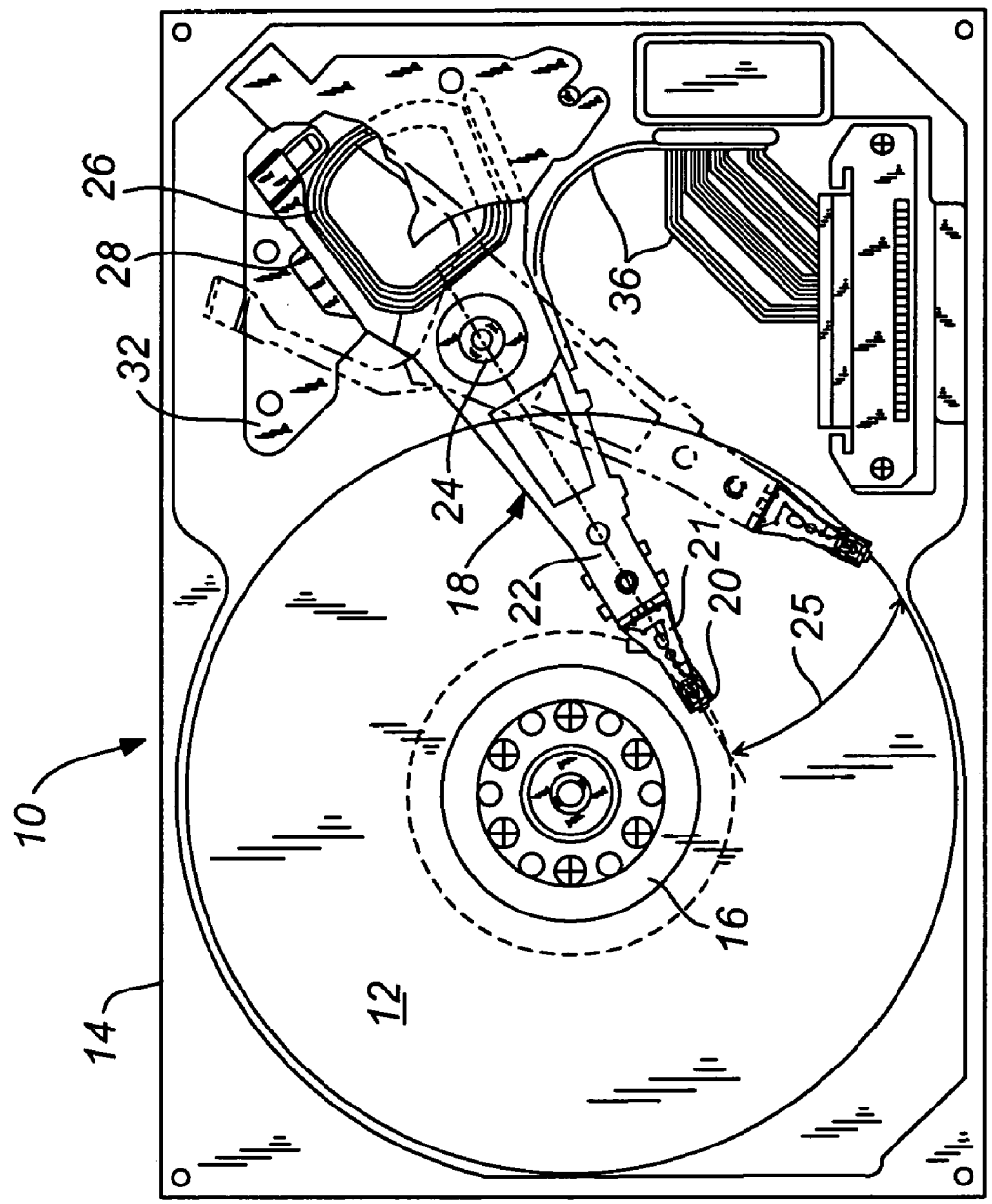
FIG. 1 is a plan view disclosing an example of a typical disk drive.

FIG. 1 shows a plan view of a typical disk drive assembly 10 with the top cover removed exposing the interior components of the drive. A disk 12 is shown, and the disk may be incorporated within a plurality of disks known as a disk pack. Each disk 12 typically has magnetic media on both the upper and lower surfaces thereof. The disk 12 is shown along with other components of the disk drive that are contained within a housing 14. The disk 12 is mounted over a hub 16 which is driven by a motor (not shown) within the hub enabling the disk to rotate at high revolutions per minute during operation. One actuator assembly 18 is shown rotatably mounted to an actuator pivot 24. Basic components of the actuator assembly 18 include a transducer or head 20 mounted on a flexor arm or suspension arm assembly 21. Suspension arm 21, in turn, is attached to an actuator arm 22. Each actuator assembly 18 is rotated to a desired disk track by a voice coil motor 26. The voice coil 26 is immersed in a magnetic field generated by a corresponding magnet 28. An actuator control circuit (not shown) causes current flow in the voice coil motor, and ultimately controls the position of the actuator assembly 18 by varying current through the voice coil. Magnet 28 is mounted to a mounting plate 32. The actuator assembly is rotatable through an arc 25 enabling the assembly to access all tracks of the disk. Other common elements of the disk drive may include a communications bus 36 that transfers electronic signals to and from the heads 20.

Each head typically includes an air bearing surface that cooperates with the air flow created by the corresponding rotating disk 12 to create an air bearing between the head and its corresponding disk surface. The air bearing generally prevents contact and wear between the disks and the heads. It is desirable to maintain each head on the center of the data track when conducting read/write operations. Each track typically contains servo bits that are utilized as part of the servo routine to locate and maintain the heads over track center lines. The air flow created by the rotating disks, as well as disk vibration and windage, may exert forces on the actuator arm. These forces decrease the stability of the servo system of the drive.

Figure 2:
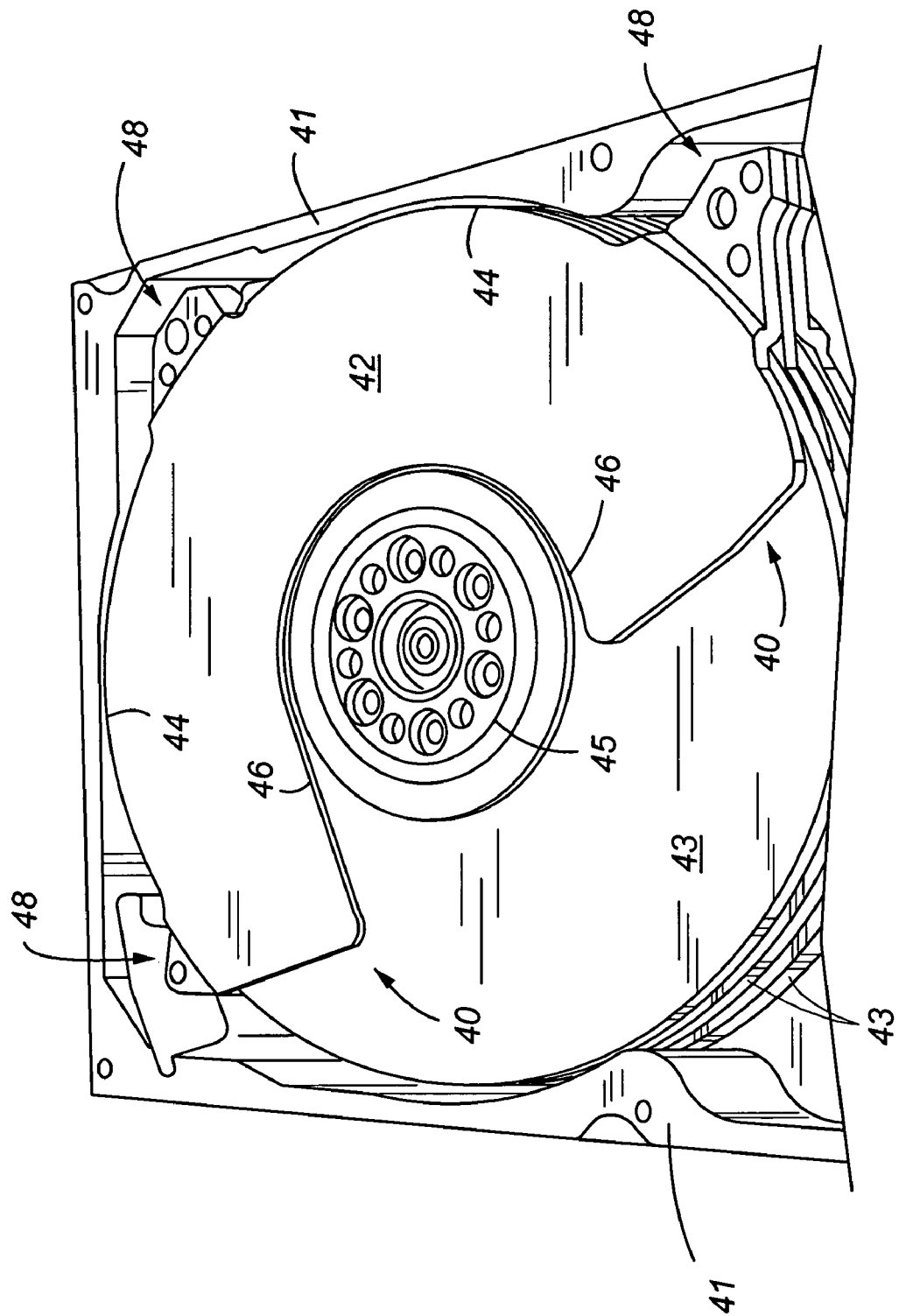
FIG. 2 is a fragmentary perspective view of a disk drive with the top cover removed and the most upper disk of a disk pack removed thus exposing an upper disk stator of the present invention.

Referring to FIG. 2, a disk stator 40 of the present invention is shown as being installed within a disk housing 41. FIG. 2 shows the top cover of the drive removed and does not illustrate the actuator assembly and other related components in order to better view the stator. A disk stator assembly of the present invention can be utilized within a disk pack comprising a plurality of disks 43. Each stator of the assembly preferably includes three mounting ears or mounting brackets 48, as further discussed below. The shape of the disk stators 40 are generally arcuate or semi-circular. Each disk stator 40 can be more specifically described as including a planar body 42, a curved inner periphery or edge 46, and a curved outer periphery or edge 44. The mounting ears/mounting brackets 48 are formed on the outer periphery. The inner edge 46 is shown as traversing in a curved pattern and spaced from the hub 45.

Figure 3:
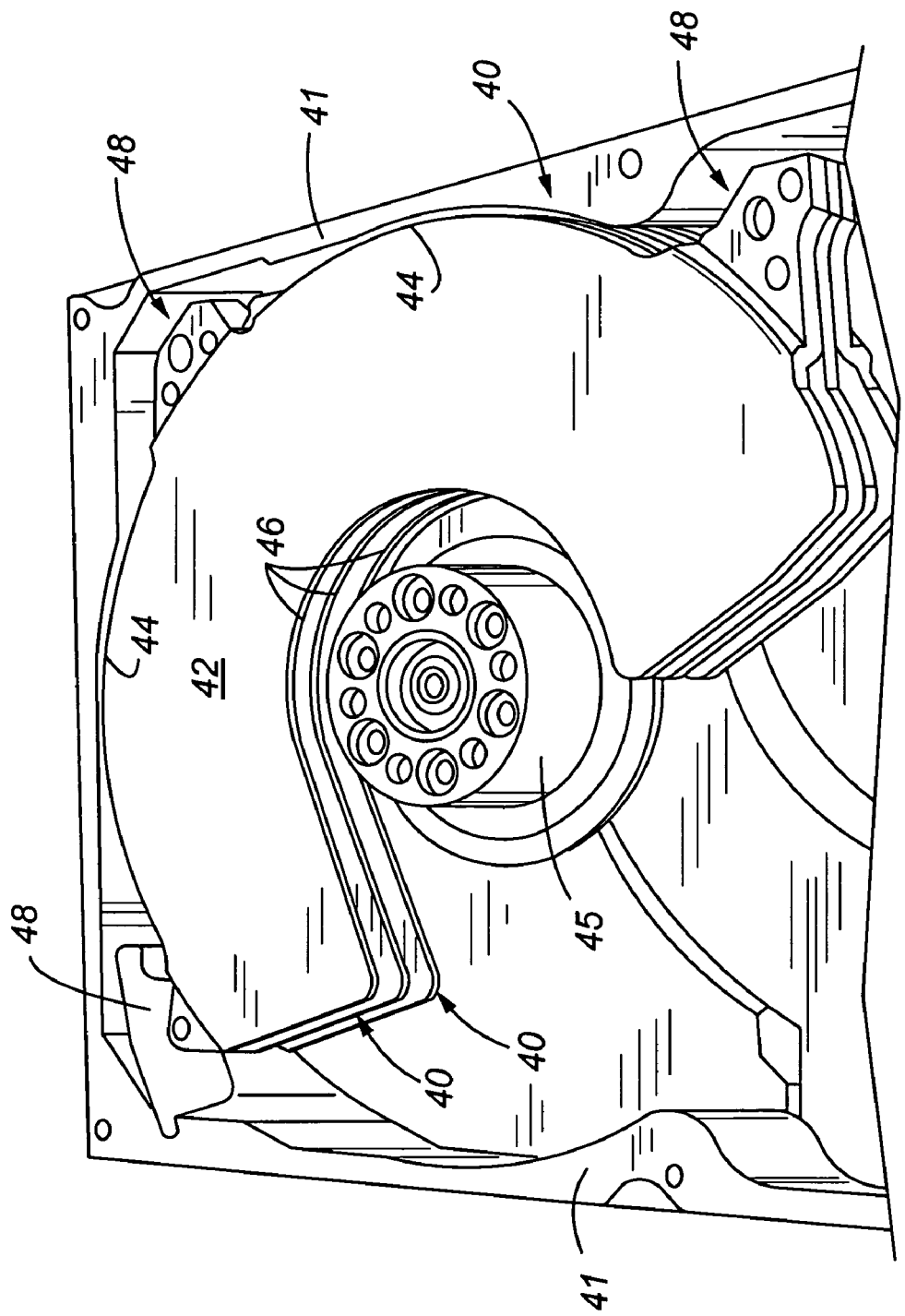
FIG. 3 is another fragmentary perspective view of the disk drive with the top cover removed and each of the disks removed thereby exposing a stacked group of three disk stators in accordance with a first embodiment of the present invention usable in a four-disk pack arrangement.
Figures 4, 5, 6:
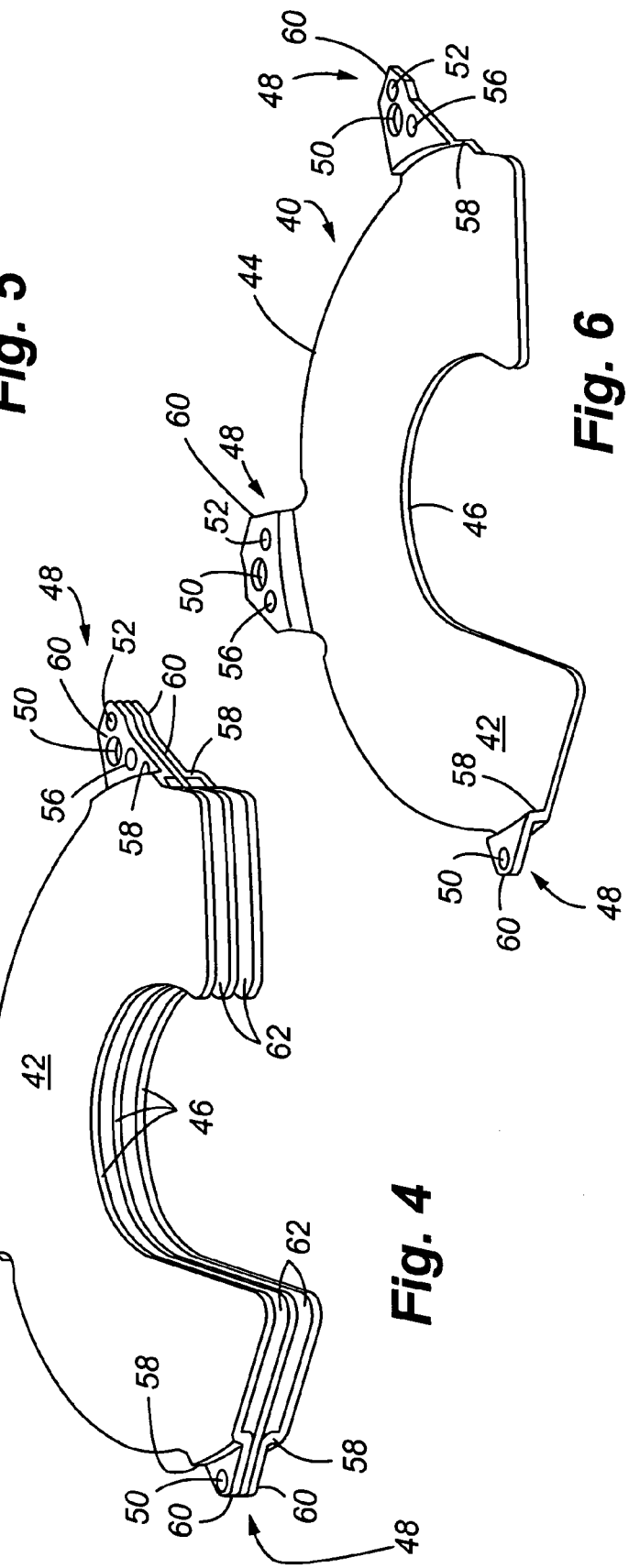
FIG. 4 is an enlarged perspective view of the group of stacked disk stators of FIG. 3.
FIG. 5 is a perspective view of the middle or interior disk stator of FIG. 3.
FIG. 6 is a perspective view of the lower disk stator of FIG. 3.

Now referring to FIGS. 3-6, a stacked arrangement of the disk stators is shown in a first embodiment, as well as individual details of each of the stators. The first embodiment is usable with a four-disk pack arrangement. FIG. 3 illustrates the stators mounted in the drive but with the disks removed. As shown in this preferred embodiment, there are three stacked disk stators wherein the three disk stators extend between the gaps in the four-disk arrangement. That is, the upper stator extends in the gap between the uppermost disk and the next lower disk, the middle or interior stator extends in the gap between the second disk and the third disk, and the lower or bottom stator extends in the gap between the third disk and most lower disk. The middle or interior stator 40 as shown in FIG. 5 has co-planar mounting brackets. The upper and lower stators have offset mounting brackets defining gaps 62 which receive the second and third disks of the disk pack. The upper and lower stators are identical in construction; however, when assembled, the lower stator is turned upside down or reversed with respect to the positioning of the upper stator. The upper and lower stators each have mounting brackets with an orthogonal or perpendicular component 58, and a parallel extending component 60. The orthogonal components 58 and parallel components 60 form respective bends. The middle stator has only the parallel extending component 60.

Each of the mounting brackets includes a mounting hole 50 which receives a fastener such as a screw (not shown). As shown, the mounting holes 50 precisely align when the stators are stacked enabling passage of the fasteners. Two of the mounting brackets on each stator also each include a tooling hole 56 which accommodates manipulation of the stators by automated manufacturing equipment that transfers and assembles the stators in the drive. The same two mounting brackets also each include an alignment hole 52 which receive corresponding mounting or locating pins (shown in FIG. 7) that extend from the base of the disk drive. One alignment hole 52 is preferably round and has a close tolerance fit with respect to the protruding locating pin of the base. The other of the alignment holes 52 preferably has a shape that is somewhat elongated or enlarged to accommodate some amount of misalignment when the stators are assembled to prevent excessive contact of the mounting pins against the stators which might otherwise contaminate the drive by production of particles.

Figures 7, 8:
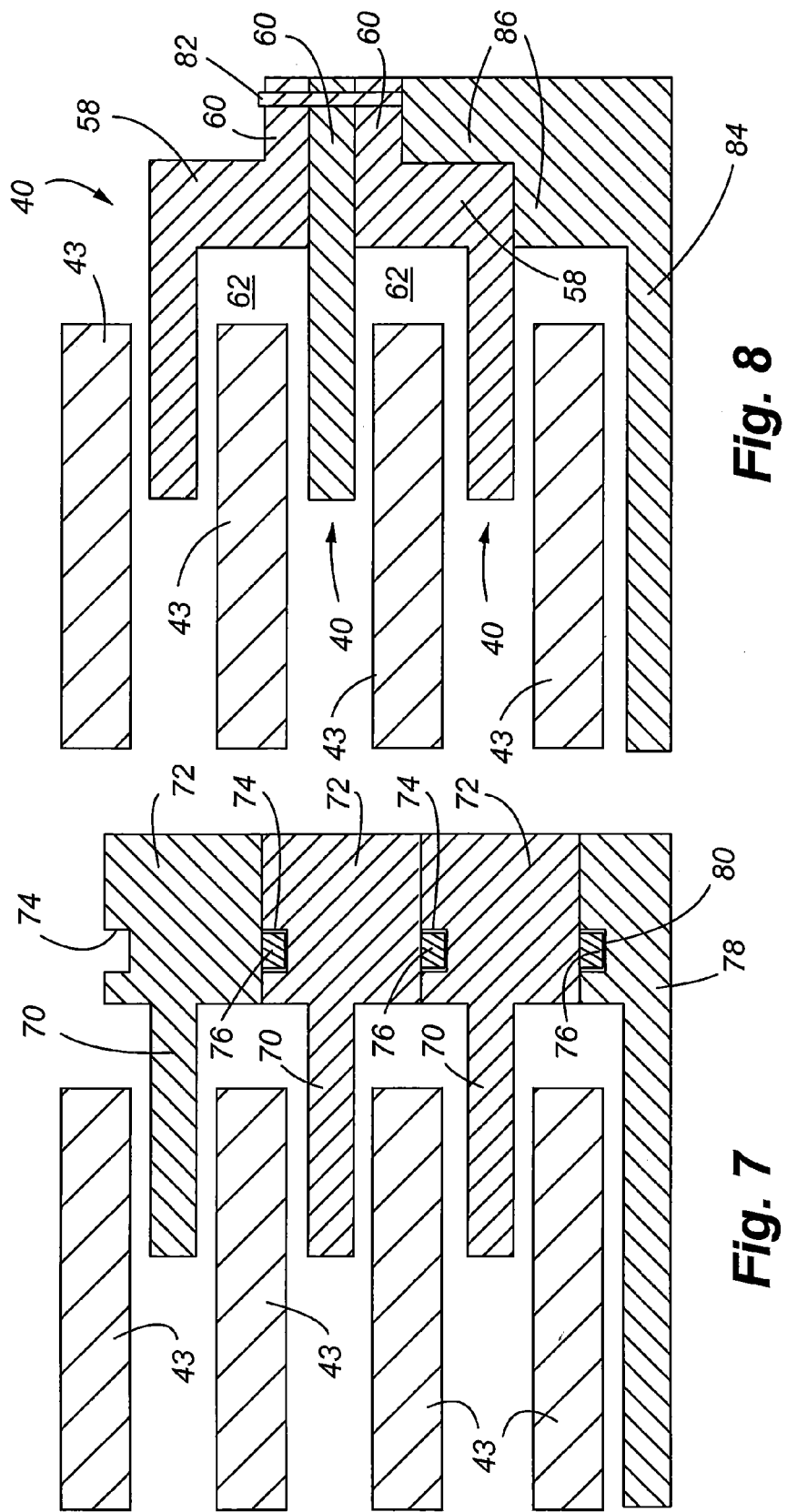
FIG. 7 is a schematic diagram illustrating a prior art arrangement of disk stators.
FIG. 8 is a schematic diagram of the first embodiment of the present invention showing a comparison to the prior art arrangement of FIG. 7.

Referring to the schematic diagrams of FIGS. 7 and 8, distinct advantages of the present invention can be seen over a prior art arrangement of disk stators. Referring first to the prior art arrangement shown in FIG. 7, one common configuration for stacking the disk stators 70 is the use of a pin and groove arrangement between the stators. Each of the prior art stators are shown as having identical construction. More specifically, the mounting brackets 72 of the prior art each include a mounting pin 76 extending from the lower surface thereof, and each bracket 72 also includes a groove or slot 74 formed on the upper surface thereof. Pins 76 must be assembled to their respective mounting brackets 72 prior to stacking of the stators. As also shown in the prior art, the base plate 78 includes a groove 80 which receives the pin 76 from the lower stator 70. The pin and groove arrangement between each of the stators increases the likelihood of non-uniform stacking, that is, increased imperfection or tolerances are a result of the pin and groove combinations. In a four-disk pack, three pins are received in three separate grooves. An imperfection in the manufacture and assembly of the pins to their respective stators may be compounded when the stators are stacked. For example, an imperfection in the form of a misaligned pin (not attached perpendicular with respect to the surface of the stator) can result in compounded misalignment if the pin is on a lower stator, since other stators stacked on the lower stator will further extend in the direction of misalignment.

Referring to FIG. 8, the disk stators 40 of the present invention show the complimentary shapes of the upper and lower stators which enable the stators to be easily stacked and secured to one another. The lower stator 40 is secured to a base extension 86 which forms an integral part of the base 84. The base extension 86 has a complementary shape to receive the bend of the mounting bracket. The base extension can be either machined directly from the base, or may be formed by a separate piece that is secured to the base 84. As shown in FIG. 8, the base extension 86 is integral with the base 84. A locating pin 82 protrudes upward from the base extension 86, and better alignment is achieved between the stators by use of a single pin within the aligned openings 52 on the mounting brackets.

Figure 9:
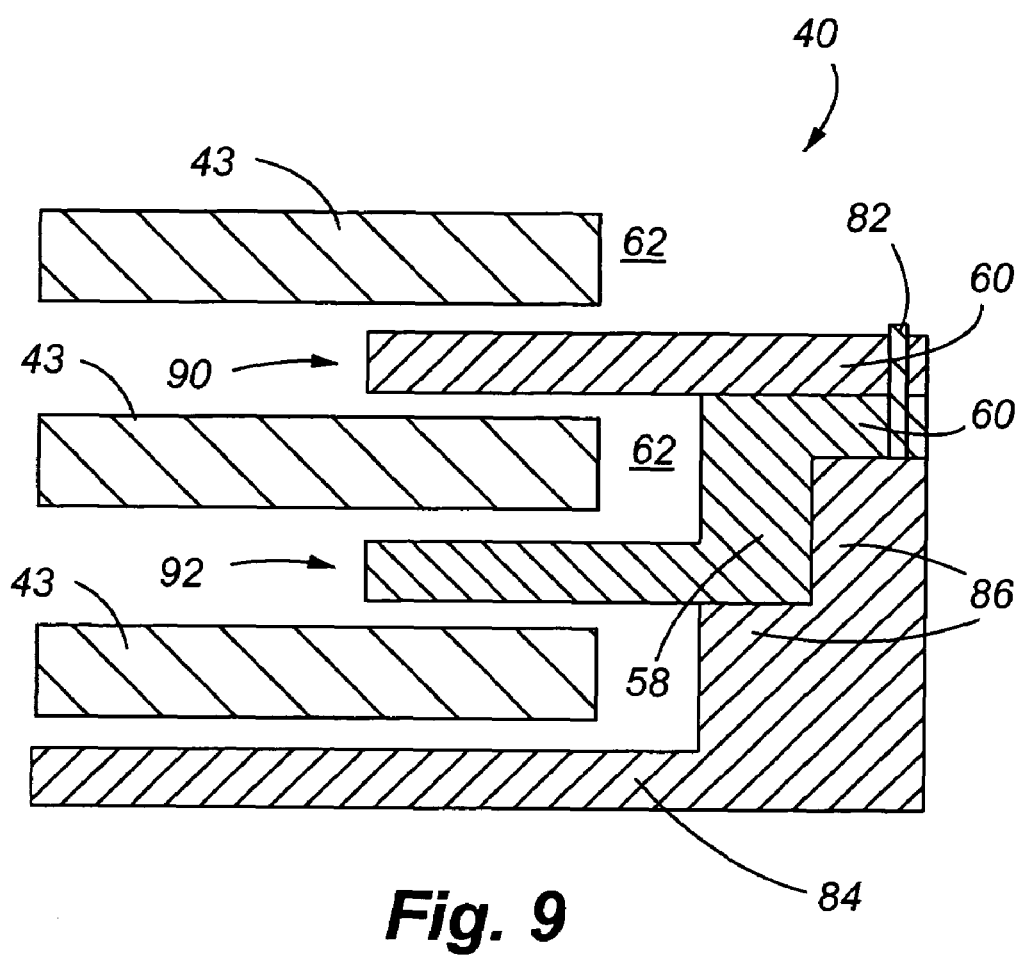
FIG. 9 shows a second embodiment of the present invention for use with a three-disk pack.

Referring now to FIG. 9, the second embodiment of the present invention is illustrated in the schematic diagram. In the second embodiment, a three-disk pack arrangement requires the use of only two disk stators, shown as upper stator 90 and lower stator 92. The upper stator 90 has the same construction as the middle stator in the first embodiment, while the lower stator 92 has the same construction as the lower stator of the first embodiment. Accordingly, the lower stator 92 has mounting brackets with an orthogonal/perpendicular component 58, and a parallel extending of component 60. The mounting brackets on the upper stator 90 are co-planar with the body of the stator. The lower stator 92 resides in the gap between the most lower and middle disk, while the upper stator 90 resides in the gap between the middle disk and the most upper disk.

Figure 10:
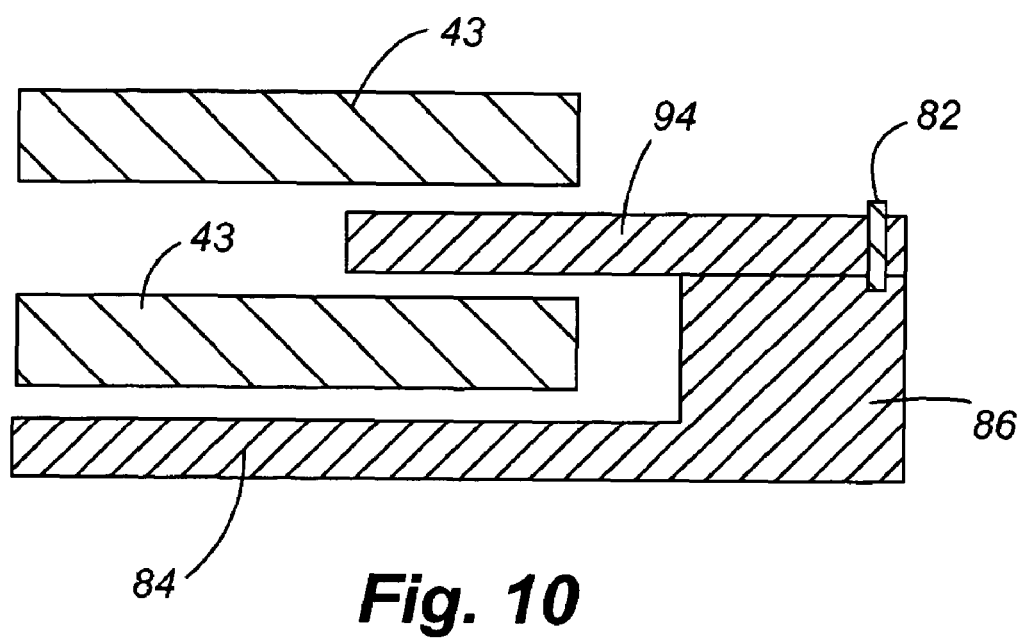
FIG. 10 shows another embodiment of the present invention for use in a two-disk pack.

Referring to FIG. 10, the third embodiment is illustrated wherein a two-disk pack arrangement is illustrated, along with a single stator 94. The single stator 94 is preferably of the same construction as the middle stator of the first embodiment, thus the stator 94 has mounting brackets that are co-planar with the body of the stator.

According to another aspect of the present invention, it is preferable for the disk stators to be manufactured through a stamping process as opposed to a machining process. In stamping, a single stock sheet of material is run through one or more stamping presses to form the stators. With the simplified shape of the stators of the present invention, it is possible to form the stators having offset brackets in a single die of a stamping press. The stators having co-planar brackets can be formed in another die. Unlike the prior art shown in FIG. 7, no machining is required, and no pins or other attachments are required to be attached in an additional manufacturing step. The locating pins on the base plate of the disk drive eliminate the need for pins on the stators.

While the present invention has been set forth above with respect to preferred embodiments in both an apparatus and method of manufacture, it shall be understood that other changes and modifications can be made within the spirit and scope of the invention commensurate with the scope of the claims appended hereto.

What is claimed is:

1. In subcombination, a disk stator for use in a stacked group of disk stators in a disk drive, said stator comprising:
    a planar body;
    a plurality of mounting brackets formed on an exterior edge of said planar body, said mounting brackets each including a first component extending substantially orthogonal to said planar body and connected to said exterior edge, and a second component connected to said first component and extending substantially parallel to said planar body, said first and second components forming a bend; and
    at least one opening formed in each said brackets.

2. A stator, as claimed in claim 1, wherein:
    at least one of said plurality of mounting brackets further includes at least one of a tooling opening and an alignment opening formed therein.

3. A stator, as claimed in claim 1, wherein:
    said stator is formed from a single piece of material by stamping.

4. A stator, as claimed in claim 1, wherein:
    said stator has an arcuate shape, and said plurality of mounting brackets are arranged in a group of three mounting brackets equally spaced along said exterior edge of said planar body.

5. A stator assembly for a disk drive, said stator assembly comprising:
   (i) an upper stator including:
      a planar body;
      a plurality of mounting brackets formed on an exterior edge of said planar body, at least one of said mounting brackets including a first component extending substantially orthogonal to said planar body and connected to said exterior edge, and a second component connected to said first component and extending substantially parallel to said planar body, said first and second components forming a bend; and
      at least one opening formed in each bracket of said plurality of brackets;
   (ii) a lower stator comprising:
      a planar body;
      a plurality of mounting brackets formed on an exterior edge of said planar body, at least one of said mounting brackets including a first component extending substantially orthogonal to said planar body and connected to said exterior edge, and a second component connected to said first component and extending substantially parallel to said planar body, said first and second components forming a bend; and
      at least one opening formed in each bracket of said plurality of brackets; and
   (iii) a middle stator positioned between said upper and lower stators, said middle stator including a planar body, a plurality of mounting brackets formed on an exterior edge of said planar body and said mounting brackets being co-planar with said planar body, and at least one opening formed in each bracket of said plurality of mounting brackets;
   said upper, middle, and lower stators being stacked upon one another so that said respective mounting brackets contact one another, said at least one openings formed in said respective brackets align with one another, the positioning of said lower stator is inverted with respect to the positioning of the upper stator, and wherein an upper gap exists between the bodies of the middle and upper stators and a lower gap exists between the bodies of the lower and middle stators.

6. A stator assembly, as claimed in claim 5, wherein:
   at least two of each of said plurality of mounting brackets further include at least one of a tooling opening and an alignment opening formed thereon.

7. A stator assembly, as claimed in claim 5, wherein:
   each said upper, middle, and lower stator is formed from a single piece of material by stamping.

8. A stator assembly, as claimed in claim 5, wherein:
   said upper stator is positioned in a gap extending between a most upper disk and a second disk within the disk drive, said middle stator is positioned in a gap extending between the second disk and a third disk within the disk drive, and said lower stator is positioned in a gap extending between the third disk and a most lower disk within the disk drive.

9. A stator assembly, as claimed in claim 5, wherein:
   each said plurality of mounting brackets of said upper, middle, and lower stators are arranged in a group of three mounting brackets equally spaced along said respective exterior edges of said planar bodies.

10. A stator assembly for a disk drive, said stator assembly comprising:
    (i) an upper stator including:
       a planar body;
       means for connecting said planar body to the disk drive and formed on an exterior edge of said planar body, said means for connecting forming a bend offset from said planar body; and
       at least one opening formed in said means for connecting;
    (ii) a lower stator comprising:
       a planar body;
       means for connecting said planar body to the disk drive and formed on an exterior edge of said planar body, said means for connecting forming a bend offset from said planar body; and
       at least one opening formed in said means for connecting;
    (iii) a middle stator positioned between said upper and lower stators, said middle stator including a planar body, means for connecting said planar body to the disk drive and formed on an exterior edge of said planar body, said means for connecting being co-planar with said planar body, and at least one opening formed in said means for connecting; and
    wherein said upper, middle, and lower stators are stacked upon one another so that said respective means for connecting contact one another, and said at least one openings formed in said respective means for connecting align with one another, the positioning of said lower stator being inverted with respect to the positioning of the upper stator, and wherein an upper gap exists between the bodies of the middle and upper stators and a lower gap exists between the bodies of the lower and middle stators.

11. A stator assembly, as claimed in claim 10, wherein:
    at least two of said means for connecting of said upper, middle, and lower stators each further include at least one of a tooling opening and an alignment opening formed thereon.

12. A stator assembly, as claimed in claim 10, wherein:
    each said upper, middle, and lower stator is formed from a single piece of material by stamping.

13. A stator assembly, as claimed in claim 10, wherein:
    said upper stator is positioned in a gap extending between a most upper disk and a second disk within the disk drive, said middle stator is positioned in a gap extending between the second disk and a third disk within the disk drive, and said lower stator is positioned in a gap extending between the third disk and a most lower disk within the disk drive.

14. A stator assembly, as claimed in claim 10, wherein:
    each said means for connecting of said upper, middle, and lower stators are arranged in a group of three means for connecting equally spaced along said respective exterior edges of said planar bodies.

15. In combination, a stator assembly and a disk drive base, said combination comprising:
    a disk drive base for housing a disk drive, said base including at least one locating pin protruding from an interior of said base;
    a stator assembly comprising:
       (i) an upper stator including:
          a planar body;
          a plurality of mounting brackets formed on an exterior edge of said planar body, said mounting brackets each including a first component extending substantially orthogonal to said planar body and connected to said exterior edge, and a second component connected to said first component and extending substantially parallel to said planar body, said first and second components forming a bend; and at least one opening formed in each said brackets;

(ii) a lower stator comprising:

a planar body;

a plurality of mounting brackets formed on an exterior edge of said planar body, at least one of said mounting brackets including a first component extending substantially orthogonal to said planar body and connected to said exterior edge, and a second component connected to said first component and extending substantially parallel to said planar body, said first and second components forming a bend; and at least one opening formed in each said brackets;

(iii) a middle stator positioned between said upper and lower stators, said middle stator including a planar body, a plurality of mounting brackets formed on an exterior edge of said planar body and said mounting brackets being co-planar with said planar body, and at least one opening formed in each said mounting brackets; and wherein said upper, middle, and lower stators are stacked upon one another so that said respective mounting brackets contact one another, and one group of openings formed in said respective brackets align with one another and receive said at least one locating pin of said base, the positioning of said lower stator is inverted with respect to the positioning of the upper stator, and further wherein an upper gap exists between the bodies of the middle and upper stators and a lower gap exists between the bodies of the lower and middle stators.

16. A stator assembly for a disk drive, said stator assembly comprising:

an upper stator including a planar body, a plurality of mounting brackets formed on an exterior edge of said planar body, at least of one of said mounting brackets including a first component extending substantially orthogonal to said planar body and connected to said exterior edge, and a second component connected to said first component and extending substantially parallel to said planar body, said first and second components forming a bend, and at least one opening formed in each said brackets;

a lower stator positioned below said upper stator, said lower stator including a planar body, and a plurality of mounting brackets formed on an exterior edge of said planar body, and said mounting brackets being co-planar with said planar body, and at least one opening formed in each said mounting brackets; and wherein said upper and lower stators are stacked upon one another so that said respective mounting brackets contact one another, and said at least one openings of said respective brackets align with one another, and further wherein a gap exists between the respective bodies of said upper and lower stators.

* * * * *